(12) United States Patent
Nakagawa

(10) Patent No.: US 8,474,825 B2
(45) Date of Patent: Jul. 2, 2013

(54) SEALING DEVICE

(75) Inventor: Takehiro Nakagawa, Fukushima (JP)

(73) Assignee: NOK Corporation (JP)

( * ) Notice: Subject to any disclaimer, the term of this patent is extended or adjusted under 35 U.S.C. 154(b) by 111 days.

(21) Appl. No.: 13/131,340

(22) PCT Filed: Oct. 6, 2009

(86) PCT No.: PCT/JP2009/067371
§ 371 (c)(1),
(2), (4) Date: May 26, 2011

(87) PCT Pub. No.: WO2010/061688
PCT Pub. Date: Jun. 3, 2010

(65) Prior Publication Data
US 2011/0221140 A1    Sep. 15, 2011

(30) Foreign Application Priority Data

Nov. 28, 2008 (JP) .................................. 2008-304096
Dec. 9, 2008 (JP) .................................. 2008-313077
May 12, 2009 (JP) .................................. 2009-115513

(51) Int. Cl.
*F16J 15/32* (2006.01)
*F16C 33/80* (2006.01)
*F16C 33/76* (2006.01)

(52) U.S. Cl.
USPC ............ 277/353; 277/572; 384/480; 384/486

(58) Field of Classification Search
USPC ......... 277/353, 549, 551, 562, 572, 575–577; 384/477, 478, 480–482, 484, 486
See application file for complete search history.

(56) References Cited

U.S. PATENT DOCUMENTS

| 5,201,529 A | 4/1993 | Heinzen | |
|---|---|---|---|
| 6,357,757 B1 * | 3/2002 | Hibbler et al. | 277/551 |
| 6,474,653 B1 * | 11/2002 | Hintenlang et al. | 277/433 |
| 6,637,754 B1 * | 10/2003 | Ohtsuki et al. | 277/549 |
| 6,979,001 B2 * | 12/2005 | Ohtsuki et al. | 277/549 |
| 7,350,976 B2 * | 4/2008 | Ohtsuki et al. | 384/448 |
| 2005/0110221 A1 * | 5/2005 | Oates | 277/549 |
| 2008/0031556 A1 * | 2/2008 | Heim et al. | 384/448 |

FOREIGN PATENT DOCUMENTS

| JP | S60-107423 U | 7/1985 |
|---|---|---|
| JP | 03-020175 A | 1/1991 |
| JP | H03-105767 U | 11/1991 |
| JP | H05-057523 U | 7/1993 |

(Continued)

*Primary Examiner* — Vishal Patel
*Assistant Examiner* — Stacy Warren
(74) *Attorney, Agent, or Firm* — Harness, Dickey & Pierce, P.L.C.

(57) ABSTRACT

To improve sealing performance, a sealing device comprises an oil seal (10) mounted to a non-rotating housing (2), and a dust cover (20) mounted to a rotating body (5) outside the oil seal (10), one of the oil seal (10) and the dust cover (20) facing each other has an external seal lip (24) slidably in close contact with the other of them (10, 20) outside the slide sections ($S_1$, $S_2$) between the oil seal (10) and the rotating body (5), the oil seal (10) and the dust cover (20) have non-contact lips (16, 25) which are positioned outside the slide sections ($S_1$, $S_2$) and inside the external seal lip (24), have substantially conical tubular shapes becoming larger in diameter toward the tips thereof, and are loosely inserted to each other, and a labyrinth seal (30) is provided at the outer diameter side of the external seal lip (24).

2 Claims, 9 Drawing Sheets

FOREIGN PATENT DOCUMENTS

| | | |
|---|---|---|
| JP | 09-144891 A | 6/1997 |
| JP | 2003-148497 A | 5/2003 |
| WO | WO-93/17263 A1 | 9/1993 |

* cited by examiner

SEALING DEVICE

CROSS-REFERENCE TO RELATED APPLICATIONS

This is a national stage of International Application No. PCT/JP2009/067371 filed on Oct. 6, 2009 and published in the Japanese language. This application claims the benefit of Japanese Application No. 2008-304096, filed on Nov. 28, 2008, Japanese Application No. 2008-313077, filed on Dec. 9, 2008 and Japanese Application No. 2009-115513, filed on May 12, 2009. The disclosures of the above applications are incorporated herein by reference.

BACKGROUND OF THE INVENTION

1. Field of the Invention

The present invention relates to a sealing device sealing a shaft periphery of a section which tends to be exposed to muddy water or the like from the outside, such as a wheel bearing of a vehicle or the like, and more particularly to a sealing device which is provided with such a structure as to prevent the muddy water or the like from making an intrusion into a slide section of an oil resisting seal lip.

2. Description of the Conventional Art

Since a sealing device used in a wheel bearing device of a vehicle, a transfer device or the like is easily splashed with muddy water or the like from the outside, it is necessary to inhibit the muddy water or the like from making an intrusion into a slide section of an oil resisting seal lip to the utmost so as to prevent a reduction of a sealing performance in the oil resisting seal lip as much as possible. FIG. 13 is a half sectional view of an installed state and shows one example of this kind of sealing device in accordance with a conventional art by cutting along a plane passing through an axis O.

In particular, in FIG. 13, reference numeral 201 denotes a housing of a transfer device of a vehicle, reference numeral 202 denotes a rotating shaft which is inserted to the housing 201 transversally (in an approximately horizontal direction), and is supported via a bearing 203 in a rotatable state around an axis O, reference numeral 204 denotes a sleeve which is fixed by a nut 205 as well as being spline-fitted to an outer periphery of the rotating shaft 202, and reference numeral 100 denotes a sealing device which is positioned at an outer side in an axial direction of the bearing 203 and is attached to an inner periphery of the housing 201.

In more detail, the sealing device 100 is constructed by an oil seal provided with an oil resisting seal lip 101 which extends to the bearing 203 side, and an external seal lip 102 and a dust lip 103 which extend to an opposite side (an outer side) to the oil resisting seal lip 101. The oil resisting seal lip 101 is structured such as to prevent leakage of lubricating oil within the bearing 203, by being slidably brought into close contact with an outer peripheral surface of the sleeve 204, and the external seal lip 102 is structured such as to be slidably brought into close contact with a seal flange section 204a formed in the sleeve 204 and the dust lip 103 is structured such as to be slidably brought into close contact with an outer peripheral surface of the sleeve 204, thereby preventing the muddy water or the like from making an intrusion into the oil resisting seal lip 101 side. Further, a labyrinth seal is formed in an outer side of the external seal lip 102 by making a dust cover 104a extended from a reinforcing ring 104 of the sealing device 100 come close to an outer diameter end section of the seal flange section 204a, thereby devising to inhibit the muddy water or the like from making an intrusion (refer, for example, to Japanese Unexamined Patent Publication No. 9-144891).

SUMMARY OF THE INVENTION

Problem to be Solved by the Invention

However, in accordance with the conventional sealing device 100, in the case that the sealing device 100 is temporarily submerged into a puddle or the like together with the housing 201 at a time of traveling on a punishing road, it is impossible to prevent the muddy water from making an intrusion. Therefore, a muddy water resistance is insufficient. Then, in order to improve the muddy water resistance, there can be a thought of increasing the numbers of the external seal lip 102 and the dust lip 103, however, in this case, an attaching space of the sealing device 100 is enlarged, and there is a risk that a sliding torque is increased and a fuel consumption is deteriorated.

Further, in the case that the muddy water in the outside makes an intrusion from a slide section between the external seal lip 102 and the seal flange section 204a, this intruding muddy water W flows down or drips onto an outer peripheral surface of the sleeve 204 along an inner surface of the external seal lip 102 and an inner surface of the seal flange section 204a. Accordingly, the intruding muddy water W enters the slide section between the sleeve 204 and the dust lip 103 so as to abrade the dust lip 103. As a result, the intruding muddy water W further enters the slide section of the oil resisting seal lip 101, and there is a risk that deterioration of the sealing performance is caused.

The present invention is made by taking the points mentioned above into consideration, and a technical object of the present invention is to provide a structure which can prevent reduction of a sealing performance caused by intruding muddy water entering a slide section of an oil seal as much as possible, in a sealing device sealing a shaft periphery or the like of a section which tends to be exposed to muddy water or the like from the outside.

Means for Solving the Problem

As a means for effectively solving the technical problem mentioned above, in accordance with a first aspect of the present invention, there is provided a sealing device comprising:

an oil seal attached to a non-rotating housing, and having an oil resisting seal lip slidably brought into close contact with a rotating body inserted transversally to an inner periphery of the housing; and a dust cover attached to the rotating body while being positioned at an outer side of the oil seal, wherein one of the oil seal and the dust cover which are opposed to each other is provided with an external seal lip which is positioned at an outer side of a slide section between the oil resisting seal lip and the rotating body and is slidably brought into close contact with the other of the oil seal and the dust cover, and the oil seal and the dust cover are provided with a plurality of non-contact lips which are positioned at an inner peripheral side of the external seal lip while being positioned at an outer side of the slide section between the oil resisting seal lip and the rotating body, are formed in approximately conical tubular shapes becoming larger in diameter toward their ends, and are loosely inserted to each other.

In the structure mentioned above, the external seal lip is structured such as to prevent the muddy water from making an intrusion into the slide section side of the oil resisting seal lip of the oil seal. Further, in the case that the muddy water in the outside makes an intrusion from the slide section of the external seal lip at an upper side of the axis of the transversally arranged rotating body, the intruding muddy water is received by any of a plurality of non-contact lips which are loosely inserted to each other in an inner peripheral side of the external seal lip, in the process of falling down or dripping along the inner surface of the external seal lip or the inner surface of the seal flange section, flows to a lower side in a circumferential direction along an outer peripheral surface of the non-contact lip, and is turned back to the slide section of the external seal lip by dripping from an end thereof. According to such the structure, even if the muddy water makes an intrusion from the slide section of the external seal lip, the muddy water is hard to reach the slide section between the oil resisting seal lip and the rotating body.

In accordance with a second aspect of the present invention, there is provided a sealing device as recited in the first aspect, wherein a labyrinth seal is formed by a dust cover and a flange opposed closely thereto, at an outer diameter side of the external seal lip, an inner diameter end of the labyrinth seal is opposed to a muddy water receiving groove which is continuously provided in a circumferential direction at a position which is shifted in an axial direction with respect to the slide section of the external seal lip.

In the structure of the second aspect mentioned above, the labyrinth seal formed between the dust cover and the flange has such a function as to make the muddy water and a foreign material hardly enter from the outside. Further, since the inner diameter end of the labyrinth seal is at the position which is shifted in the axial direction with respect to the slide section of the external seal lip, the muddy water making an intrusion from the labyrinth seal at an upper side of the axis of the transversally arranged rotating body does not drip to the slide section of the external seal lip, but is caught by the muddy water receiving groove opposed to the inner diameter end of the labyrinth seal so as to flow down in the circumferential direction, and is turned back to the outside from the labyrinth seal at a lower side of the axis of the rotating body. According to such the structure, even if the muddy water makes an intrusion from the labyrinth seal, the muddy water hardly reaches the slide section of the external seal lip provided at the outer side as well as it hardly reaches the slide section of the oil resisting seal lip.

In accordance with a third aspect of the present invention, there is provided a sealing device as recited in the first aspect, wherein a labyrinth seal in which an extension section of the oil seal and the dust cover are close to each other is provided at an outer diameter side of the external seal lip, and the labyrinth seal is constructed by an inside disc-shaped gap between the extension section and the dust cover which are opposed in the axial direction to each other, a tubular gap between the extension section and the dust cover which are opposed in a radial direction to each other at an outer side thereof, and an outer diameter gap between a collar section formed in one of the extension section and the dust cover and an outer tube section formed in the other of the extension section and the dust cover, which are opposed in the axial direction to each other at a further outer side thereof.

In the structure of the third aspect mentioned above, the labyrinth seal is structured such that the muddy water hardly makes an intrusion into the external seal lip side. Further, in the labyrinth seal, the outer diameter gap is structured such as to prevent the muddy water from making an intrusion from the outside on the basis of centrifugal force which is generated in accordance with rotation of the dust cover rotating together with the rotating body, the tubular gap is a section for preventing the muddy water making an intrusion through the outer diameter gap from immediately reaching the external seal lip side, and the inside disc-shaped gap has a muddy water rejecting action from the inner diameter side of the tubular gap on the basis of the centrifugal force generated in accordance with the rotation of the dust cover. Accordingly, even if the muddy water in the outside makes an intrusion through the outer diameter gap in the labyrinth seal, the muddy water hardly reaches the external seal lip side, and even if it reaches, a further intrusion is prevented by the slide section of the external seal lip.

Further, in accordance with a fourth aspect of the present invention, there is provided a sealing device as recited in the second aspect, wherein a muddy water receiving groove is formed in an outer periphery of a root of a muddy water receiving lip provided between the labyrinth seal and the external seal lip.

Further, in accordance with a fifth aspect of the present invention, there is provided a sealing device as recited in the third aspect, wherein one of the oil seal and the dust cover which are opposed to each other, is provided with an auxiliary seal lip which is positioned between the external seal lip and the labyrinth seal, is slidably brought into close contact with the other of the oil seal and the dust cover, and has a smaller fastening margin than that of the external seal lip.

Further, in accordance with a sixth aspect of the present invention, there is provided a sealing device as recited in the third aspect, wherein the external seal lip is slidably brought into close contact with an outer peripheral surface of a cylinder section which is formed in the other of the oil seal and the dust cover.

Effect of the Invention

In accordance with the sealing device on the basis of the first aspect of the present invention, even if the muddy water in the outside makes an intrusion from the slide section of the external seal lip, the intruding muddy water is turned back to the slide section of the external seal lip by a plurality of non-contact lips which are loosely inserted to each other in the inner peripheral side of the external seal lip. Accordingly, it is possible to effectively prevent the intruding muddy water from entering the slide section between the oil resisting seal lip and the rotating body without causing an increase of the sliding torque, and it is possible to secure an excellent muddy water resisting seal function.

In accordance with the sealing device on the basis of the second or third aspect of the present invention, since the intrusion of the muddy water from the outside is suppressed by the labyrinth seal formed between the dust cover and the flange, and the intruding muddy water passing through the labyrinth seal is caught by the muddy water receiving groove and turned back to the outside from the labyrinth seal without reaching the slide section of the external seal lip, it is possible to effectively prevent the abrasion caused by entering of the intruding muddy water into the slide section without causing any increase of the sliding torque, and it is possible to secure an excellent muddy water resisting seal function.

In accordance with the sealing device on the basis of the fourth aspect of the present invention, since the labyrinth seal has an excellent rejecting action with respect to the muddy water at the outer diameter side of the external seal lip, it is possible to effectively prevent the intruding muddy water from entering the slide section between the oil resisting seal lip and the rotating body, and it is possible to secure an excellent muddy water resisting seal function.

In accordance with the sealing device on the basis of the fifth aspect of the present invention, in addition to the effect obtained by the fourth aspect, it is possible to secure a further excellent muddy water resisting seal function while suppressing an increase of a sliding resistance by the auxiliary seal lip.

In accordance with the sealing device on the basis of the sixth aspect of the present invention, in addition to the effect obtained by the fourth aspect, since a fastening margin of the external seal lip does not change even if an error of an attaching position in the axial direction exists between the oil seal at the housing side and the dust cover at the rotating body side, it is possible to achieve a stable muddy water resisting seal function.

DETAILED DESCRIPTION OF PREFERRED EMBODIMENTS

Figure 1:
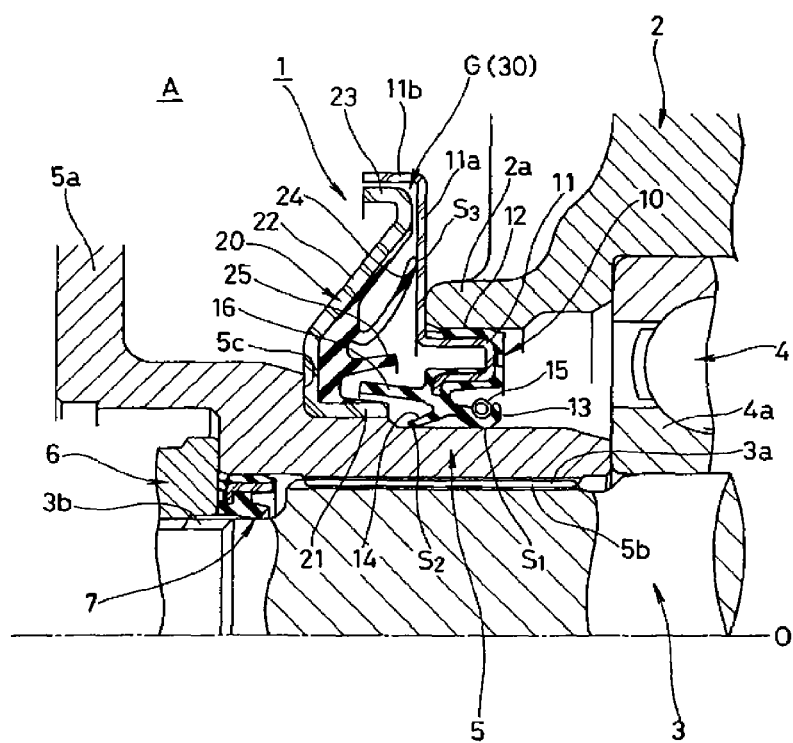
FIG. 1 is a half sectional view of an installed state and shows a preferable first embodiment of a sealing device in accordance with the present invention by cutting along a plane passing through an axis O.
Figure 2:
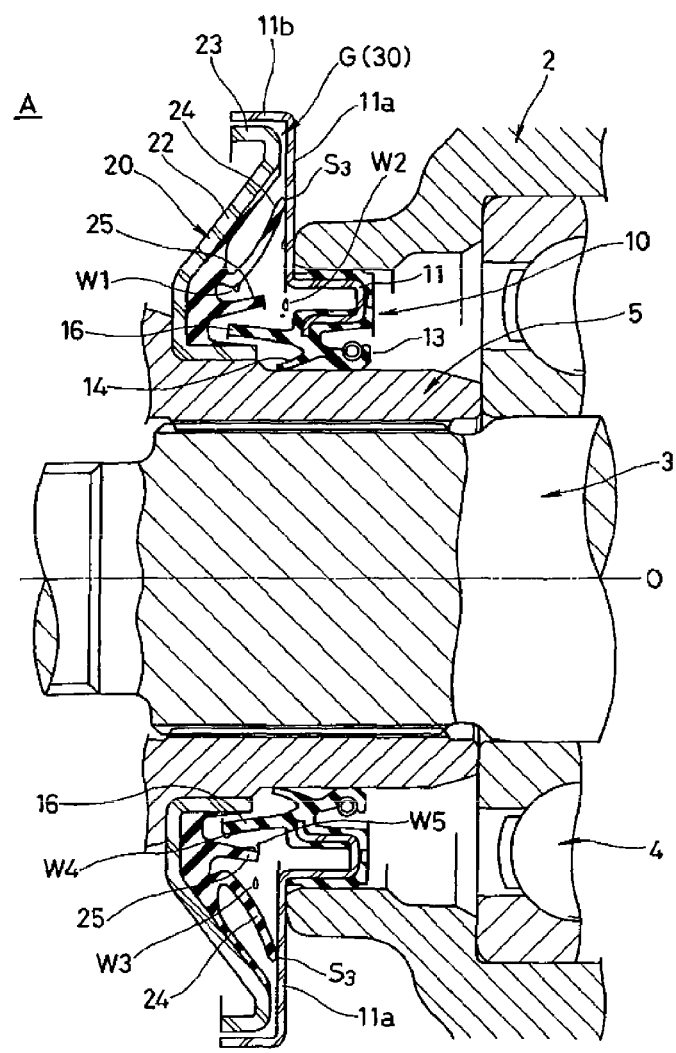
FIG. 2 is a sectional view of the installed state and shows the device by cutting along the plane passing through the axis O, for explaining an operation in accordance with the first embodiment.

A description will be given below of embodiments of a sealing device in accordance with the present invention with reference to the accompanying drawings. FIG. 1 is a half sectional view of an installed state and shows a preferable first embodiment of the sealing device in accordance with the present invention by cutting along a plane passing through an axis O, and FIG. 2 is a sectional view of the installed state and shows the device by cutting along the plane passing through the axis O, for explaining an operation in accordance with the first embodiment.

In FIG. 1, reference numeral 2 denotes a non-rotating housing in a transfer device of a vehicle, reference numeral 3 denotes a rotating shaft which is inserted to the housing 2 transversally (in an approximately horizontal direction) and is supported in a state of being rotatable around the axis O via a bearing 4, and reference numeral 5 denotes a sleeve which is positioned at an inner peripheral side of an opening end section 2a of the housing 2 and into which the rotating shaft 3 inserted. In this case, the rotating shaft 3 and the sleeve 5 correspond to the rotating body described in the first aspect.

The sleeve 5 is structured such that a spline section 5b formed in an inner peripheral surface thereof is fitted to a spline section 3a formed in an outer peripheral surface of the rotating shaft 3 with each other, and is fixed in an axial direction in a state in which the end thereof is brought into contact with an inner ring 4a of the bearing 4, by a nut 6 engaged with a male thread section 3b which is positioned at an outer side thereof in an axial direction and is formed on an outer peripheral surface of the rotating shaft 3. A section between the rotating shaft 3 and the sleeve 5 is sealed by a packing 7 which is prevented from coming off by the nut 6 while being positioned at an outer side in the axial direction of a fitting section of the spline sections 3a and 5b so as to be interposed. Further, a companion flange 5a is formed in an outer end section of the sleeve 5, and is connected to a propeller shaft (not shown) or the like.

Reference numeral 1 denotes a sealing device in accordance with the present invention, which is provided with an oil seal 10 attached to an inner peripheral surface of the opening end section 2a of the housing 2, and a dust cover 20 attached to an outer peripheral surface of the sleeve 5 while being positioned at an outer side in the axial direction of the oil seal 10.

The oil seal 10 is integrally formed by a rubber material or a synthetic resin material having a rubber-like elasticity on a reinforcing ring 11 which is manufactured by punch-press-forming, for example, a metal plate, preferably an SUS ring or a plated steel sheet in view of rust prevention, and is provided with an outer peripheral seal section 12 which is press-fitted and attached to an inner peripheral surface of the opening end section 2a of the housing 2, an oil resisting seal lip 13 which extends to the bearing 4 side from an inner diameter position of the reinforcing ring 11 and is slidably brought into close contact with an outer peripheral surface of the sleeve 5 by an inner diameter section in the vicinity of its end, and a dust lip 14 which extends to an opposite side to the oil resisting seal lip 13 from the inner diameter position of the reinforcing ring 11 and is slidably brought into close contact with an outer peripheral surface of the sleeve 5 by an inner periphery of its end. A garter spring 15 compensating tensional force is fitted and attached to the oil resisting seal lip 13.

A seal flange 11a and an outer diameter tube section 11b which are exposed out of the outer peripheral seal section 12 are extended in an outer diameter section of the reinforcing ring 11 of the oil seal 10. Describing in detail, the seal flange 11a in the reinforcing ring 11 is expanded approximately in a disc shape to the outer diameter side, its inner diameter section is brought into contact with an end surface of the opening end section 2a of the housing 2, and the outer diameter tube section 11b is formed in a cylindrical shape which is directed to an opposite side to the housing 2 from an outer diameter end section of the seal flange 11a.

The dust cover 20 is manufactured by punch-press-forming a metal plate, preferably an SUS ring or a plated steel sheet in view of rust prevention, and has an inner diameter tube section 21 which is press-fitted and attached to an outer peripheral surface of the sleeve 5, an intermediate flange section 22 which inclines so as to come close to the seal flange 11a side in the reinforcing ring 11 of the oil seal 10 while expanding in an outer diameter direction from the inner diameter tube section 21, and a bent edge section 23 which is bent so as to have an approximately L-sectional shape along the seal flange 11a and the outer diameter tube section 11b in the reinforcing ring 11 of the oil seal 10 from an outer diameter section of the intermediate flange section 22. Further, a labyrinth seal 30 constructed by a narrow labyrinth gap G which is bent so as to have an approximately L-sectional shape is formed between the bent edge section 23, and the seal flange 11a and the outer diameter tube section 11b.

In this case, in order to obtain an effective labyrinth seal function, it is preferable that the labyrinth gap G is narrower and longer, however, when taking into consideration a dispersion of an assembling precision or the like, it is necessary to prevent the seal flange 11a and the outer diameter tube section 11b in the reinforcing ring 11 of the oil seal 10 from interfering with the dust cover 20, by applying a certain degree of clearance. Specifically, the labyrinth gap G is set to be 3 mm or less (preferably about 1.5 mm), and a length thereof is set to be 1 mm or more.

An external seal lip 24 and a non-contact lip 25 which are made of a rubber material or a synthetic resin material having a rubber-like elasticity are integrally formed on a surface directed to the oil seal 10 side, of the intermediate flange section 22 in the dust cover 20. Describing in detail, the external seal lip 24 is structured to extend in a conical tubular shape in which the end is larger in diameter, is positioned at an outer side of slide sections S1 and S2 between the oil resisting seal lip 13 and the dust lip 14 of the oil seal 10, and the sleeve 5, and is slidably brought into close contact with the seal flange 11a in the reinforcing ring 11 of the oil seal 10 by its end. Further, the non-contact lip 25 exists in an inner peripheral side of the external seal lip 24, is positioned at an outer side of the slide sections S1 and S2 between the oil resisting seal lip 13 and the dust lip 14, and the sleeve 5, and is formed in an approximately conical tubular shape in which the end directed to the oil seal 10 side is larger in diameter.

On the other hand, a non-contact lip 16 made of a rubber material or a synthetic resin material having a rubber-like elasticity is formed on the oil seal 10. Describing in detail, the non-contact lip 16 extends in a conical tubular shape in which the end is larger in diameter, from an outer peripheral side of a root of the dust lip 14 in the oil seal 10 toward an inner peripheral space of the non-contact lip 25 provided in the dust cover 20. In other words, the non-contact lips 25 and 16 are loosely inserted to each other, between the slide sections S1 and S2 between the oil resisting seal lip 13 and the dust lip 14 of the oil seal 10, and the sleeve 5, and the slide section S3 between the external seal lip 24 of the dust cover 20 and the seal flange 11a in the reinforcing ring 11 of the oil seal 10.

In the sealing device 1 in accordance with the first embodiment structured as mentioned above, the oil seal 10 is positioned and fixed to the housing 2, by press-fitting the outer peripheral seal section 12 reinforced by the reinforcing ring 11 to the inner peripheral surface of the opening end section 2a of the housing 2, and bringing the seal flange 11a of the reinforcing ring 11 into contact with the end surface of the opening end section 2a. On the other hand, the dust cover 20 is positioned and fixed to the sleeve 5, by press-fitting and attaching the inner diameter tube section 21 to the outer peripheral surface of the sleeve 5, and bringing it into contact with a step surface 5c formed on an outer peripheral surface of the sleeve 5. Further, an illustrated installed state is achieved by the rotating shaft 3 being thereafter inserted into the sleeve 5 and fixed.

Further, the external seal lip 24 provided on the dust cover 20 which rotates together with the rotating shaft 3 and the sleeve 5 is slidably brought into close contact with the seal flange 11a in the reinforcing ring 11 of the non-rotating oil seal 10 by its end, thereby preventing the muddy water or the like from making an intrusion from an outside space A. Further, since the labyrinth seal 30 is formed by the narrow labyrinth gap G between the bent edge section 23 of the dust cover 20, and the seal flange 11a and the outer diameter tube section 11b in the reinforcing ring 11, at an outer side (an outer peripheral side) of the external seal lip 24, it is possible to effectively prevent the muddy water from making an intrusion into the slide section S3 of the external seal lip 24 from the outside space A.

On the other hand, the oil resisting seal lip 13 of the oil seal 10 is structured to prevent lubricating oil supplied to the bearing 4 from leaking from the outer periphery of the sleeve 5 to the outside space A, through the slide section S1 with the sleeve 5. Further, the dust lip 14 of the oil seal 10 is structured to prevent the muddy water or the like, which passes through the slide section S3 of the external seal lip 24 and the non-contact lips 25 and 16 to the inner peripheral side, from entering the slide section S1 of the oil resisting seal lip 13, by being slidably brought into close contact with the outer peripheral surface of the sleeve 5 in the outer side of the oil resisting seal lip 13.

In the case that the sealing device 1 is temporarily submerged together with the housing 2 at a time of traveling on a punishing road, whereby the muddy water passes through the labyrinth seal 30 between the bent edge section 23 of the dust cover 20, and the seal flange 11a and the outer diameter tube section 11b, from the outside space A, and further passes through the slide section S3 of the external seal lip 24 in an inner side thereof, the intruding muddy water passing through the slide section S3 of the external seal lip 24 falls down along the inner surface of the external seal lip 24 as shown by reference symbol W1 and drips to the outer peripheral surface of the non-contact lip 25 existing at the lower side thereof, or comes down along the inner surface of the seal flange 11a as shown by reference symbol W2 and drips to the outer peripheral surface of the non-contact lip 16 existing at its lower side, at an upper side of the axis O of the transversally arranged rotating shaft 3 (the sleeve 5), as shown in FIG. 2.

Since both the non-contact lips 25 and 16 are formed in the conical tubular shape in which the end is larger in diameter, the end is directed slightly upward at the upper side of the axis O of the transversally arranged rotating shaft 3 (the sleeve 5), and the end is directed slightly downward instead at the lower side of the axis O. Accordingly, the intruding muddy water received by the outer peripheral surfaces of the non-contact lips 25 and 16 flows down in the circumferential direction along the outer peripheral surfaces of the non-contact lips 25 and 16. Further, the intruding muddy water coming down to the position just below the axis O on the outer peripheral surface of the non-contact lip 25 at the outer peripheral side drips from the end which comes to a lowest position of the non-contact lip 25, and is turned back to the slide section S3 of the external seal lip 24, as shown by reference symbol W3 in FIG. 2. On the other hand, the intruding muddy water coming down to the position just below the axis O on the outer peripheral surface of the non-contact lip 16 at the inner peripheral side drips to the inner peripheral surface of the non-contact lip 25 from the end which comes to a lowest position of the non-contact lip 16, as shown by reference symbol W4, further flows toward the end which comes to a lowest position of the non-contact lip 25, as shown by reference symbol W5, drips therefrom as shown by reference symbol W3, and is turned back to the slide section S3 of the external seal lip 24.

Further, since the external seal lip 24 provided on the dust cover 20 rotates together with the rotating shaft 3 (the sleeve 5), the intruding muddy water turned back to the slide section S3 of the external seal lip 24 is discharged to the outside space A while scattering to a further outer peripheral side on the basis of centrifugal force.

Accordingly, it is possible to prevent the intruding muddy water from entering the slide sections S2 and S1 between the dust lip 14 and the oil resisting seal lip 13 in the oil seal 10, and the outer peripheral surface of the sleeve 5, and it is possible to effectively prevent reduction of a sealing function due to abrasion of the dust lip 14 and the oil resisting seal lip 13. Further, since the non-contact lips 25 and 16 are in non-contact, it is possible to prevent the intruding muddy water from making an intrusion toward the slide sections S2 and S1 without generating any sliding torque.

Figure 3:
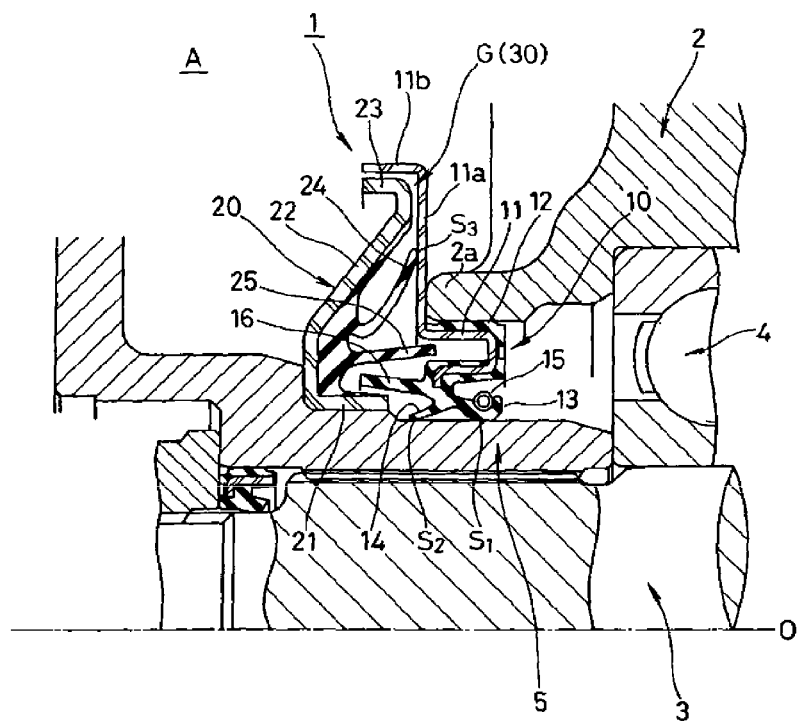
FIG. 3 is a half sectional view of an installed state and shows a preferable second embodiment of the sealing device in accordance with the present invention by cutting along a plane passing through an axis O.

Next, FIG. 3 is a half sectional view of an installed state and shows a preferable second embodiment of the sealing device in accordance with the present invention by cutting along a plane passing through an axis O. The second embodiment is structured such that the non-contact lip 25 provided on the dust cover 20 extends to an inner peripheral side of the reinforcing ring 11 reinforcing the outer peripheral seal section 12 of the oil seal 10 which is press-fitted to the inner peripheral surface of the opening end section 2*a* of the housing 2, and the non-contact lip 25 can receive most of the intruding muddy water which comes down from the slide section S3 along the inner surface of the external seal lip 24 and the inner side surface of the seal flange 11*a* so as to drip at the upper side of the axis O of the transversally arranged rotating shaft 3 (the sleeve 5), in the case that the intruding muddy water passes through into the inner side of the slide section S3 of the external seal lip 24. The other sections are the same as those of FIG. 1, and it is possible to achieve the same effect as the first embodiment.

Figure 4:
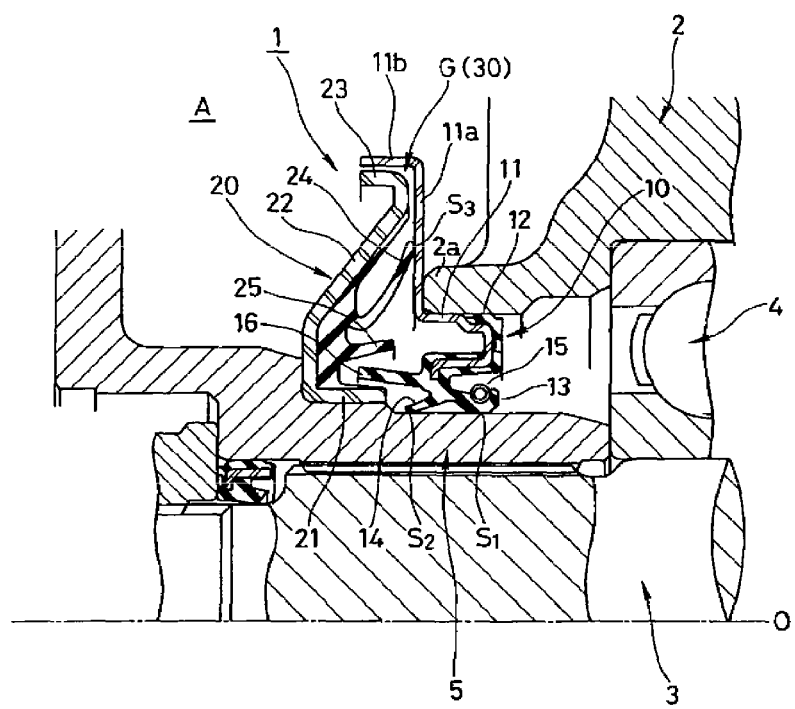
FIG. 4 is a half sectional view of an installed state and shows a preferable third embodiment of the sealing device in accordance with the present invention by cutting along a plane passing through an axis O.

FIG. 4 is a half sectional view of an installed state and shows a preferable third embodiment of the sealing device in accordance with the present invention by cutting along a plane passing through an axis O. The third embodiment is structured such that a positioning precision of the oil seal 10 is improved by metal-fitting the reinforcing ring 11 of the oil seal 10 to the inner peripheral surface of the opening end section 2*a* of the housing 2, thereby suppressing a dispersion of the fastening margin of the external seal lip 24 with respect to the seal flange 11*a*. In this case, the outer peripheral seal section 12 is formed in series with the metal-fitting section of the reinforcing ring 11 in the axial direction. The other sections are the same as FIG. 1, and the same effect as that of the first embodiment can be achieved.

Figure 5:
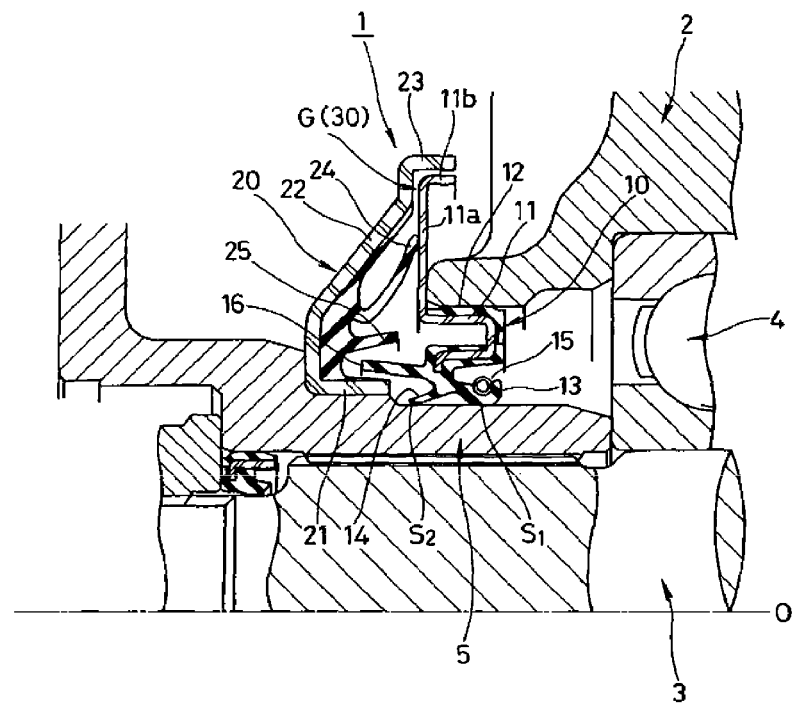
FIG. 5 is a half sectional view of an installed state and shows a preferable fourth embodiment of the sealing device in accordance with the present invention by cutting along a plane passing through an axis O.

FIG. 5 is a half sectional view of an installed state and shows a preferable fourth embodiment of the sealing device in accordance with the present invention by cutting along a plane passing through an axis O. This embodiment is structured such that the outer diameter tube section 11*b* of the reinforcing ring 11 of the oil seal 10 extends from an outer diameter end section of the seal flange 11*a* toward the housing 2 side, and the bent edge section 23 of the dust cover 20 extends along an outer peripheral side of the outer diameter tube section 11*b* of the reinforcing ring 11, from an outer diameter section of the intermediate flange section 22 in the dust cover 20 toward the housing 2 side, thereby forming the labyrinth seal 30 (the labyrinth gap G) in a bent shape having an inverted L-shape to that in FIG. 1. The other sections are the same as FIG. 1, and the same effect as that of the first embodiment can be achieved.

Figure 6:
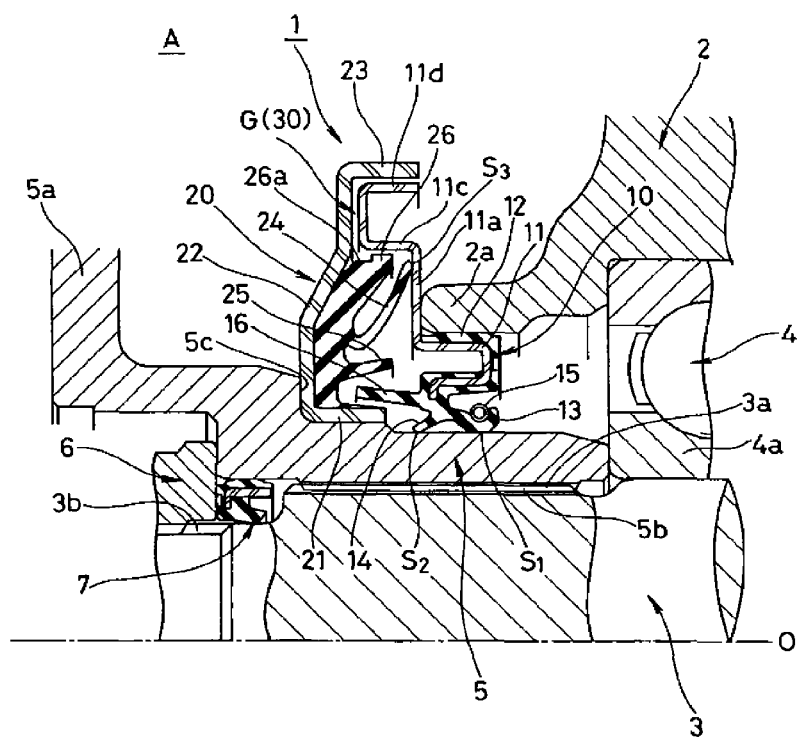
FIG. 6 is a half sectional view of an installed state and shows a preferable fifth embodiment of the sealing device in accordance with the present invention by cutting along a plane passing through an axis O.
Figure 7:
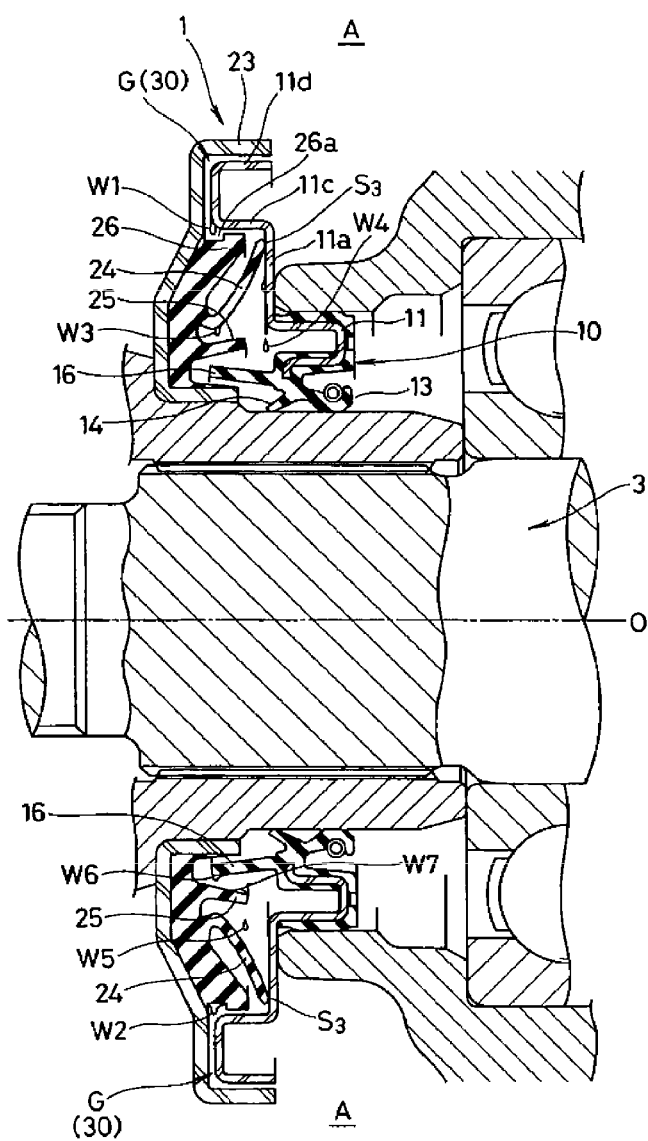
FIG. 7 is a sectional view of the installed state and shows the device by cutting along the plane passing through the axis O, for explaining an operation in accordance with the fifth embodiment.

Next, FIG. 6 is a half sectional view of an installed state and shows a preferable fifth embodiment of the sealing device in accordance with the present invention by cutting along a plane passing through an axis O, and FIG. 7 is a sectional view of the installed state and shows the device by cutting along the plane passing through the axis O, for explaining an operation in accordance with the fifth embodiment.

In this fifth embodiment, a description will be given of a different point from the previously described first embodiment. The seal flange 11*a*, an intermediate tube section 11*c* and a labyrinth flange 11*d* which are exposed from the outer peripheral seal section 12 extend in an outer diameter section of the reinforcing ring 11 of the oil seal 10. Describing in detail, the seal flange 11*a* in the reinforcing ring 11 expands approximately in a disc shape to an outer diameter side and is brought into contact with an end section of the opening end section 2*a* of the housing 2 by its inner diameter section, the intermediate tube section 11*c* extends cylindrically from an outer diameter end section of the seal flange 11*a* toward an opposite side to the housing 2, and the labyrinth flange 11*d* corresponds to the flange described in the second aspect and is formed in a bent shape having a C-sectional shape which protrudes toward an opposite side to the housing 2 together with the intermediate tube section 11*c*.

The dust cover 20 is manufactured by punch-press-forming a metal plate, preferably an SUS ring or a plated steel sheet in view of rust prevention, and has an inner diameter tube section 21 which is press-fitted and attached to an outer peripheral surface of the sleeve 5, an intermediate flange section 22 which inclines to the seal flange 11*a* side in the reinforcing ring 11 of the oil seal 10 while expanding in an outer diameter direction from the inner diameter tube section 21, and a bent edge section 23 which is bent to have an approximately L-sectional shape along the labyrinth flange 11*d* in the reinforcing ring 11 of the oil seal 10 from an outer diameter section of the intermediate flange section 22. Further, a narrow labyrinth gap G (a labyrinth seal 30) which is bent to have an approximately L-sectional shape is formed between the bent edge section 23 and the labyrinth flange 11*d*.

An external seal lip 24, a non-contact lip 25 and a muddy water receiving lip 26 are integrally formed by a rubber material or a synthetic resin material having a rubber-like elasticity, on a surface (an inner side surface) directed to the oil seal 10 side of the intermediate flange section 22 in the dust cover 20.

The external seal lip 24 and the non-contact lip 25 are the same as the previously described first embodiment. The muddy water receiving lip 26 is positioned between the external seal lip 24 and the labyrinth gap G, extends to have a conical tubular shape in which the end is larger in diameter, and is structured such that a muddy water receiving groove 26a which is opposed to an inner diameter end of the labyrinth gap G from an inner diameter side and is continuously provided in a circumferential direction is formed in an outer peripheral surface of a root thereof, and the end is close to and opposed to an inner peripheral surface of the intermediate tube section 11c in the reinforcing ring 11 of the oil seal 10.

In the sealing device 1 in accordance with the fifth embodiment structured as mentioned above, similarly to the previously described first embodiment, the oil resisting seal lip 13 of the oil seal 10 is structured so as to prevent the lubricating oil supplied to the bearing 4 from leaking to the outside space A from the outer periphery of the sleeve 5 through the slide section S1 with respect to the sleeve 5, the dust lip 14 is structured so as to prevent the foreign material from entering the slide section S1 of the oil resisting seal lip 13 from the outer side thereof, by being slidably brought into close contact with the outer peripheral surface of the sleeve 5 at the outer side of the oil resisting seal lip 13, and the external seal lip 24 provided on the dust cover 20 rotating together with the rotating shaft 3 and the sleeve 5 is structured so as to prevent the muddy water or the like from making an intrusion from the outside space A, by its end being slidably brought into close contact with the seal flange 11a in the reinforcing ring 11 of the non-rotating oil seal 10. Further, since the narrow labyrinth gap G is formed at the outer side (the outer peripheral side) of the external seal lip 24, by the bent edge section 23 of the dust cover 20, and the labyrinth flange 11d of the reinforcing ring 11, it is possible to effectively prevent the muddy water from making an intrusion into the external seal lip 24 side from the outside space A.

In this case, the inner diameter end of the labyrinth gap G is at the position which is shifted in the axial direction from the slide section S3 of the external seal lip 24, owing to the intermediate tube section 11c in the reinforcing ring 11 of the oil seal 10, and thereby the structure is made such that the intruding muddy water from the labyrinth gap G hardly flows into the slide section S3 of the external seal lip 24, even if the muddy water in the outside space A flows into the labyrinth gap G by the temporary submersion of the sealing device 1 together with the housing 2, at a time of traveling on a punishing road. Further, the end of the muddy water receiving lip 26 forming the muddy water receiving groove 26a is close to and opposed to the inner peripheral surface of the intermediate tube section 11c in the reinforcing ring 11 of the oil seal 10, and the labyrinth gap which is continuously provided with the labyrinth gap G by the bent edge section 23 of the dust cover 20 and the labyrinth flange 11d of the reinforcing ring 11 is constructed between both the elements. This structure also effectively contributes to the prevention of the intruding muddy water from flowing into the slide section S3.

Further, the intruding muddy water passing through the labyrinth gap G at the upper side of the axis O of the transversally arranged rotating shaft 3 (the sleeve 5) drips from the inner diameter end of the labyrinth gap G so as to be caught by the muddy water receiving groove 26a of the muddy water receiving lip 26 which is just below the same as shown by reference symbol W1 in FIG. 7, flows down in a circumferential direction thereof, and is turned back to the outside space A through the labyrinth gap G from the lower end position of the muddy water receiving groove 26a, as shown by reference symbol W2 in FIG. 7, at the lower side of the axis O.

Accordingly, not only it is possible to prevent the intruding muddy water from the labyrinth gap G from entering the slide sections S2 and S1 between the dust lip 14 and the oil resisting seal lip 13 in the oil seal 10, and the outer peripheral surface of the sleeve 5, but also the muddy water hardly enter the slide section S3 of the external seal lip 24 provided in the outer side thereof. Accordingly, it is possible to suppress the abrasion of the slide sections S1 to S3 so as to secure an excellent seal function.

Further, in the case that a part of the intruding muddy water from the labyrinth gap G flows into the slide section S3 of the external seal lip 24 so as to pass through the slide section S3, the intruding muddy water comes down along the inner surface of the external seal lip 24 from the slide section S3 of the external seal lip 24 and drips on the outer peripheral surface of the non-contact lip 25 existing at the lower side thereof as shown by reference symbol W3 in FIG. 7, or comes down along the inner side surface of the seal flange 11a and drips on the outer peripheral surface of the non-contact lip 16 existing in the lower side thereof as shown by reference symbol W4, at the upper side of the axis O of the transversally arranged rotating shaft 3 (the sleeve 5).

Since the non-contact lips 25 and 16 are both formed in a conical tubular shape in which the end is larger in diameter, the end is directed slightly upward at the upper side of the axis O of the transversally arranged rotating shaft 3 (the sleeve 5), and the end is directed slightly downward instead at the lower side of the axis O. Accordingly, the intruding muddy water received by the outer peripheral surfaces of the non-contact lips 25 and 16 flows down in the circumferential direction along the outer peripheral surfaces of the non-contact lips 25 and 16. Further, among them, the intruding muddy water coming down along the outer peripheral surface of the non-contact lip 25 at the outer peripheral side to the position which is just below the axis O drips from the lowest end of the non-contact lip 25 and is turned back to the slide section S3 of the external seal lip 24, as shown by reference symbol W5 in FIG. 7. On the other hand, the intruding muddy water coming down along the outer peripheral surface of the non-contact lip 16 at the inner peripheral side to the position which is just below the axis O drips from the lowest end of the non-contact lip 16 to the inner peripheral surface of the non-contact lip 25 as shown by reference symbol W6, further flows toward the lowest end of the non-contact lip 25 as shown by reference symbol W7, drips therefrom as shown by reference symbol W5, is turned back to the slide section S3 of the external seal lip 24, and is discharged to the outside space A through the labyrinth gap G.

Accordingly, it is possible to prevent the intruding muddy water from entering the slide sections S2 and S1 between the dust lip 14 and the oil resisting seal lip 13 in the oil seal 10, and the outer peripheral surface of the sleeve 5 so as to effectively prevent the reduction of the seal function due to the abrasion of the dust lip 14 and the oil resisting seal lip 13. Further, since the muddy water receiving lip 26 and the non-contact lips 25 and 16 are non-contact, it is possible to prevent the intruding muddy water from making an intrusion into the slide sections S2 and S1 side without generating any sliding torque.

Figure 8:
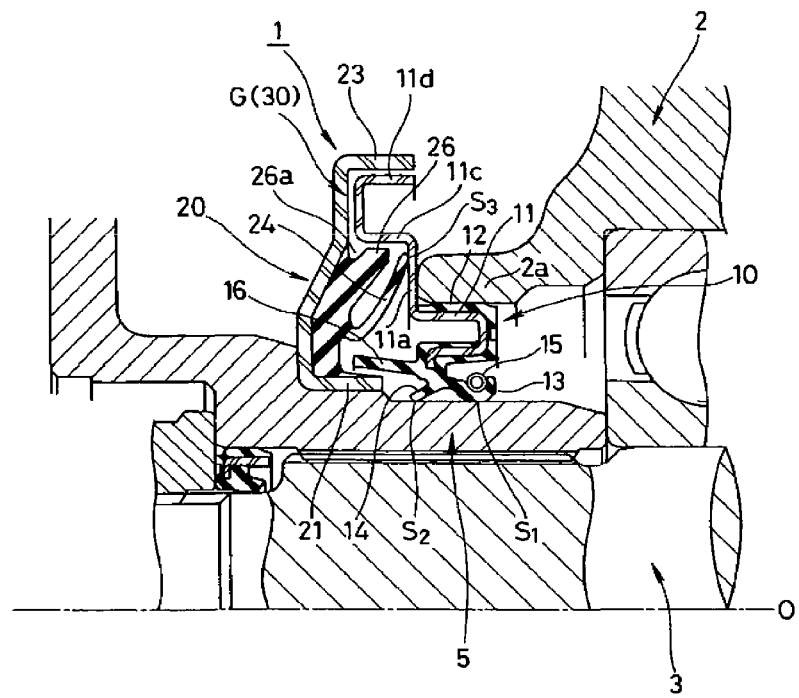
FIG. 8 is a half sectional view of an installed state and shows a preferable sixth embodiment of the sealing device in accordance with the present invention by cutting along a plane passing through an axis O.

Next, FIG. 8 is a half sectional view of an installed state and shows a sixth embodiment of the sealing device in accordance with the present invention by cutting along a plane passing through an axis O.

The embodiment shown in FIG. 8 is structured such that the intruding muddy water dripping off from the slide section S3 of the external seal lip 24 in the upper side of the axis O is caught only by the non-contact lip 16 provided in the oil seal 10. Further, the muddy water receiving groove 26a is formed in a V-sectional shape by an outer peripheral surface of the muddy water receiving lip 26. The other sections are the same as those of FIG. 6, and the same effect as that of the fifth embodiment can be achieved.

In addition, it is preferable to improve the positioning precision of the oil seal 10 by forming a metal fitted section to the inner peripheral surface of the opening end section 2a of the housing 2, in the reinforcing ring 11 of the oil seal 10, thereby suppressing the dispersion of the fastening margin of the external seal lip 24 with respect to the seal flange 11a. In this case, the outer peripheral seal section 12 is formed in series with the metal fitted section of the reinforcing ring 11 in the axial direction.

Figure 9:
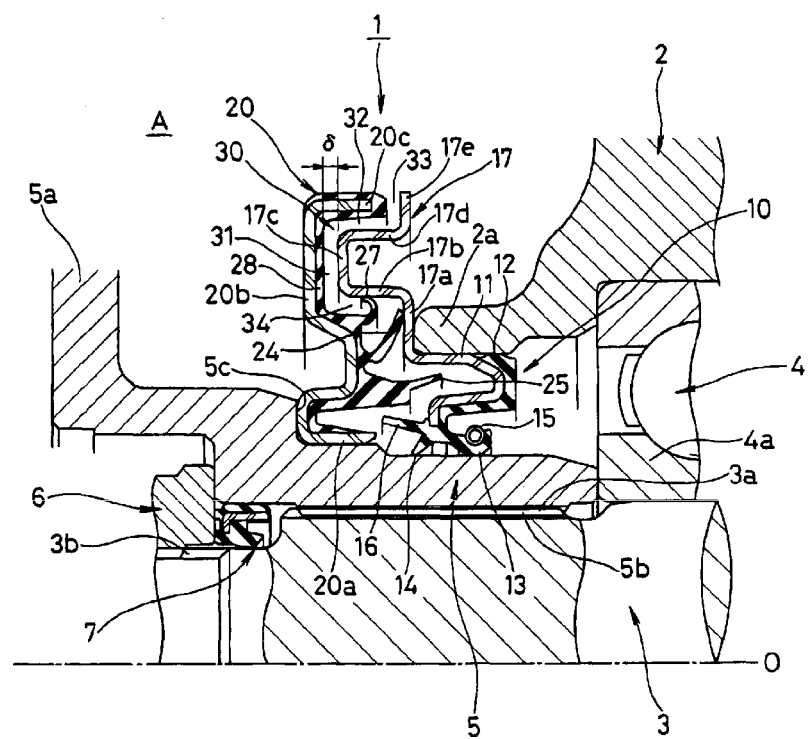
FIG. 9 is a half sectional view of an installed state and shows a preferable seventh embodiment of the sealing device in accordance with the present invention by cutting along a plane passing through an axis O.
Figure 10:
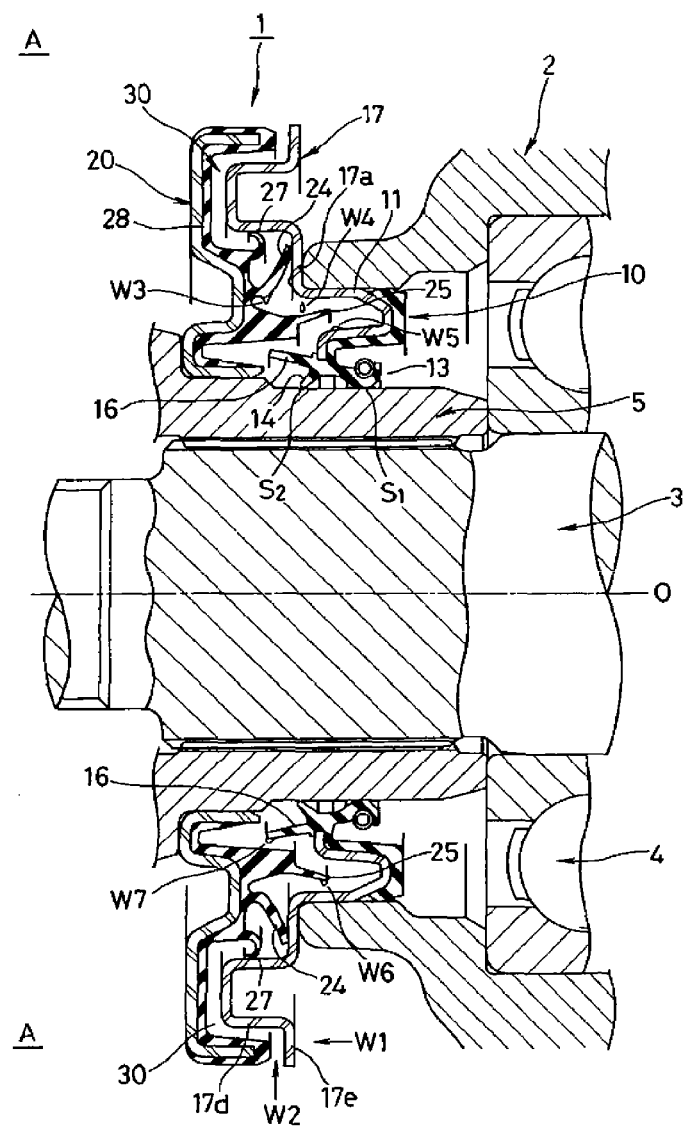
FIG. 10 is a sectional view of the installed state and shows the device by cutting along the plane passing through the axis O, for explaining an operation in accordance with the seventh embodiment.

Next, FIG. 9 is a half sectional view of an installed state and shows a preferable seventh embodiment of the sealing device in accordance with the present invention by cutting along a plane passing through an axis O, and FIG. 10 is a sectional view of the installed state and shows the device by cutting along the plane passing through the axis O, for explaining an operation in accordance with the seventh embodiment.

Describing a different point from the previously described first embodiment in this seventh embodiment, an extension section 17 extends from an outer diameter section of the reinforcing ring 11 of the oil seal 10. The extension section 17 is constructed by an inner diameter flange 17a which expands approximately in a disc shape to the outer diameter side of the reinforcing ring 11 so as to be brought into contact with an end surface of the opening end section 2a of the housing 2, an intermediate tube section 17b which is directed to an opposite side to the housing 2 from the outer diameter end thereof so as to extend in a cylindrical shape, an intermediate flange 17c which expands approximately in a disc shape again to the outer diameter side from the end section thereof, an outer tube section 17d which is folded back cylindrically to the housing 2 side from the outer diameter end thereof, and a collar section 17e which expands approximately in a disc shape from an end section thereof to the outer diameter side.

The dust cover 20 is manufactured by punch-press-forming a metal plate, and has an inner diameter fitted section 20a which is press-fitted and attached to the outer peripheral surface of the sleeve 5, a flange section 20b which expands in an outer diameter direction from the inner diameter fitted section 20a and is opposed to the inner diameter flange 17a to the intermediate flange 17c in the extension section 17 of the reinforcing ring 11 of the oil seal 10, and an outer tube section 20c which extends from an outer diameter end of the flange section 20b in such a manner as to surround an outer peripheral side of the outer tube section 17d of the extension section 17 and the end of which is opposed in an axial direction to the collar section 17e of the extension section 17.

The non-contact lip 25, the external seal lip 24 and an auxiliary seal lip 27, and an elastic layer 28 which is extended from a root of each of the lips so as to be attached in such a manner as to cover an inner surface of the dust cover 20 (a surface directed to the reinforcing ring 11 and the extension section 17 side of the oil seal 10) are integrally formed by a rubber-like elastic material (a rubber material or a synthetic resin material having a rubber-like elasticity), on a surface directed to the oil seal 10 side, of the flange section 20b in the dust cover 20.

Describing in detail, the non-contact lip 25 is positioned at an outer peripheral side of the non-contact lip 16 formed on the oil seal 10, and is formed in a gently grading conical tubular shape in which the end directed to the oil seal 10 side is larger in diameter. Further, the external seal lip 24 extends so as to have a conical tubular shape in which the end is larger in diameter, at an outer peripheral side of the non-contact lip 25, and is slidably brought into close contact with the inner diameter flange 17a in the extension section 17 of the reinforcing ring 11 of the oil seal 10. Further, the auxiliary seal lip 27 extends to an outer diameter side so as to curve in a convex shape toward the external seal lip 24 side, at an outer peripheral side of the external seal lip 24, and an outer diameter end section is slidably brought into close contact with an inner peripheral surface of the intermediate tube section 17b in the extension section 17.

A labyrinth seal 30 by a zigzag bent narrow gap is formed between the flange section 20b and the outer tube section 20c of the dust cover 20, and the extension section 17 of the reinforcing ring 11 of the oil seal 10. In particular, the labyrinth seal 30 is constructed by an inside disc-shaped gap 31 corresponding to a section in which the intermediate flange 17c of the extension section 17 and the flange section 20b of the dust cover 20 (or the elastic layer 28 attached to the inner side surface thereof) are opposed to each other in the axial direction, a tubular gap 32 corresponding to a section in which the outer tube section 17d of the extension section 17 and the outer tube section 20c of the dust cover 20 (or the elastic layer 28 attached to an inner peripheral surface thereof) are opposed to each other in a radial direction at an outer side thereof, an outer diameter gap 33 corresponding to a section in which the collar section 17e of the extension section 17 and the outer tube section 20c of the dust cover 20 (or the elastic layer 28 attached to the end thereof) are opposed to each other in the axial direction at a further outer side thereof, and an inside tubular gap 34 between an inner diameter of the disc-shaped gap 31 and the auxiliary seal lip 27.

In the sealing device 1 in accordance with the seventh embodiment structured as mentioned above, the oil seal 10 is positioned and fixed to the housing 2 by press-fitting the outer peripheral seal section 12 reinforced by the reinforcing ring 11 to the inner peripheral surface of the opening end section 2a of the housing 2, and bringing the inner diameter flange 17a of the extension section 17 of the reinforcing ring 11 into contact with the end surface of the opening end section 2a. On the other hand, the dust cover 20 is positioned and fixed to the sleeve 5, by press-fitting and attaching the inner diameter fitted section 20a to the outer peripheral surface of the sleeve 5, and bringing it into contact with the step surface 5c formed on the outer peripheral surface of the sleeve 5. Further, the rotating shaft 3 is thereafter inserted into the sleeve 5 and fixed, whereby an illustrated installed state is achieved.

At this time, even if the fitted section to the reinforcing ring 11 of the oil seal 10 on the inner peripheral surface of the housing 2 is scratched due to the press-fitting, the sealing performance of the outer peripheral seal section 12 is not adversely affected by the scratch, since the outer peripheral seal section 12 of the oil seal 10 is positioned at the inner side of the metal fitted section between the reinforcing ring 11 and the housing 2. Further, since the oil seal 10 is positioned in the axial direction by the inner diameter flange 17a at a time of being press-fitted, and is fixed to the housing 2 by the metal-fitting, it does not float in the axial direction after being press-fitted. Accordingly, an attaching precision is improved.

The oil resisting seal lip 13 of the oil seal 10 is structured such as to prevent the lubricating oil supplied to the bearing 4 from leaking to the outside space A from the outer periphery of the sleeve 5, through the slide section with respect to the sleeve 5. Further, the dust lip 14 of the oil seal 10 is structured so as to prevent the foreign material from entering the slide section of the oil resisting seal lip 13 from the outer side of the oil resisting seal lip 13.

On the other hand, the external seal lip 24 provided on the dust cover 20 rotating together with the rotating shaft 3 and the sleeve 5 is slidably brought into close contact with the inner diameter flange 17a in the extension section 17 of the reinforcing ring 11 of the non-rotating oil seal 10 by its end, and the auxiliary seal lip 27 at an outer peripheral side thereof is slidably brought into close contact with the intermediate tube section 17b in the extension section 17, thereby preventing the muddy water or the like from making an intrusion from the outside space A. Further, since the labyrinth seal 30 constructed by the zigzag bent narrow gap is formed between the flange section 20b and the outer tube section 20c (the elastic layer 28) of the dust cover 20, and the extension section 17, at the outer side (the outer peripheral side) of the auxiliary seal lip 27, it is possible to effectively prevent the muddy water from making an intrusion into the slide section of the auxiliary seal lip 27 and the external seal lip 24 from the outside space A.

Further, as shown by reference symbol W1 in FIG. 10, the intrusion into the labyrinth seal 30 of muddy water, for example, splashed in the axial direction during travel is obstructed by the collar section 17e in the extension section 17 of the reinforcing ring 11 of the oil seal 10. Further, as shown by reference symbol W2 in FIG. 10, since muddy water, for example, splashed from the lower side during travel comes into collision with the outer tube section 17d in the extension section 17, it does not come up to the slide section of the auxiliary seal lip 27.

Particularly, since the labyrinth seal 30 has the tubular gap 32 at the outer side of the inside disc-shaped gap 31, and the outer diameter gap 33 open to the outer diameter side from the outer side thereof, a muddy water rejecting effect is enhanced. This is because the muddy water tends to stay in the tubular gap 32 even if the muddy water makes an intrusion from the outer diameter gap 33, and the muddy water within the tubular gap 32 is rejected by a push-pull coaction of a pushing action generated by centrifugal force in the inside disc-shaped gap 31 and a pulling action generated by centrifugal force in the outer diameter gap 33, and is hard to reach the auxiliary seal lip 27 side.

Describing in detail, in accordance with a test carried out by the inventor, as shown in the following Table 1, the muddy water rejecting effect is greater in an embodiment in which the labyrinth seal 30 is formed in a shape having the tubular gap 32 and the outer diameter gap 33 at the outer side of the inside disc-shaped gap 31 like as the embodiment mentioned above, in comparison with a comparative example in which the labyrinth seal is constructed only by the inside disc-shaped gap 31 without providing the tubular gap 32 and the outer diameter gap 33, and it is confirmed that the same muddy water rejecting effect as that in the case that a gap dimension (refer to FIG. 9) in an axial direction of the inside disc-shaped gap 31 is narrowed to 1.5 mm in the comparative example can be maintained, even in the case that the gap dimension is set to 5 mm in the embodiment.

TABLE 1

| dimension of δ(mm) | 1.5 | 3.0 | 5.0 |
| --- | --- | --- | --- |
| comparative example | ◉ | ○ | Δ |
| embodiment | ◉ | ◉ | ◉ |

◉: great muddy water rejecting effect
○: some muddy water rejecting effect
Δ: no muddy water rejecting effect The auxiliary seal lip 27 is structured such as to dam the muddy water passing through the labyrinth seal 30 so that it is hard to immediately reach the slide section of the external seal lip 24, and the auxiliary seal lip 27 is formed in a folded shape, whereby the pressing force applied to the intermediate tube section 17b of the extension section 17 of the reinforcing ring 11 becomes small, and is formed thinner in comparison with the external seal lip 24 so as to suppress the increase of the pressing force caused by the centrifugal force, thereby preventing the sliding resistance from being increased.

Further, in the case that the sealing device 1 is temporarily submerged together with the housing 2 at a time of traveling on a punishing road or the like, whereby the muddy water passes through the labyrinth seal 30 from the outside space A, and further passes through the slide sections of the auxiliary seal lip 27 and the external seal lip 24, the muddy water passing through the slide sections of the auxiliary seal lip 27 and the external seal lip 24 comes down along the inner surface of the external seal lip 24 and drips on the outer peripheral surface of the root of the non-contact lip 25 existing at the lower side thereof, as shown by reference symbol W3 in FIG. 10, or drips from the inner side surface of the inner diameter flange 17a to the non-contact lip 25 existing at the lower side thereof, or comes down to the outer peripheral surface of the non-contact lip 16, as shown by reference symbols W4 and W5 in FIG. 10, at the upper side of the axis O of the transversally arranged rotating shaft 3 (the sleeve 5).

Since the non-contact lips 25 and 16 are both formed in the conical tubular shape in which the end is larger in diameter, the ends are directed slightly upward at the upper side of the axis O of the transversally arranged rotating shaft 3 (the sleeve 5), and the ends are directed slightly downward instead at the lower side of the axis O. Accordingly, the muddy water received by the outer peripheral surface of the non-contact lips 25 and 16 flows down in the circumferential direction along the outer peripheral surface of the non-contact lips 25 and 16.

Further, among them, the muddy water coming down to the position which is just below the axis O along the outer peripheral surface of the non-contact lip 25 at the outer peripheral side drips from the lowest end of the non-contact lip 25, and is turned back to the slide section of the external seal lip 24, as shown by reference symbol W6 in FIG. 10. On the other hand, the muddy water coming down to the position which is just below the axis O along the outer peripheral surface of the non-contact lip 16 at the inner peripheral side drips from the lowest end of the non-contact lip 16 to the inner peripheral surface of the non-contact lip 25 as shown by reference symbol W7, further flows toward the lowest end of the non-contact lip 25, drips as shown by reference symbol W6 therefrom, and is turned back to the slide section of the external seal lip 24. Further, it is turned back to the auxiliary seal lip 27 side on the basis of the centrifugal force from the slide section of the external seal lip 24, passes through the slide section to the outer side, and is further discharged to the outside space A while scattering to the outer peripheral side within the labyrinth seal 30.

Accordingly, it is possible to prevent the muddy water from entering the slide sections S2 and S1 between the dust lip 14 and the oil resisting seal lip 13 in the oil seal 10 and the sleeve 5 so as to effectively prevent the sealing function from being lowered by the abrasion of the dust lip 14 and the oil resisting seal lip 13.

Figure 11:
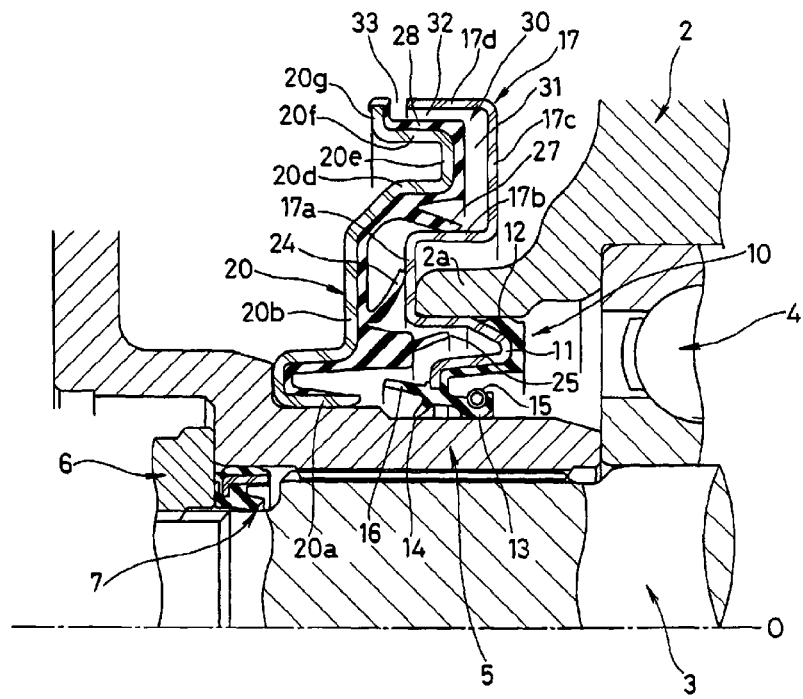
FIG. 11 is a half sectional view of an installed state and shows a preferable eighth embodiment of the sealing device in accordance with the present invention by cutting along a plane passing through an axis O.

Next, FIG. 11 is a half sectional view of an installed state and shows a preferable eighth embodiment of the sealing device in accordance with the present invention by cutting along a plane passing through an axis O.

In this embodiment, describing a different point from the previously described seventh embodiment, the extension section 17 extending from the outer diameter section of the reinforcing ring 11 of the oil seal 10 is constructed by an inner diameter flange 17*a* which expands approximately in a disc shape to the outer diameter side of the reinforcing ring 11 so as to be brought into contact with the end surface of the opening end section 2*a* of the housing 2, an intermediate tube section 17*b* which extends in a cylindrical shape in such a manner as to surround an outer peripheral side of the opening end section 2*a* of the housing 2 from its outer diameter end, an intermediate flange 17*c* which expands approximately in a disc shape again to the outer diameter side from the end section thereof, and an outer tube section 17*d* which is folded back cylindrically to an opposite side to the housing 2 from the outer diameter end thereof.

On the other hand, the dust cover 20 is constructed by an inner diameter fitted section 20*a* which is press-fitted and attached to the outer peripheral surface of the sleeve 5, a flange section 20*b* which expands in an outer diameter direction from the inner diameter fitted section 20*a*, an intermediate tube section 20*d* which extends cylindrically to an outer peripheral side of the intermediate tube section 17*b* in the extension section 17 of the reinforcing ring 11 from its outer diameter end, an intermediate flange 20*e* which expands approximately in a disc shape again to the outer diameter side from its end section and is opposed to the intermediate flange 17*c* in the extension section 17, an outer tube section 20*f* which is folded back cylindrically to an opposite side to the housing 2 in an inner peripheral side of the outer tube section 17*d* in the extension section 17 from its outer diameter end, and a collar section 20*g* which expands approximately in a disc shape from its end section to an outer diameter side and is opposed to an end of the outer tube section 17*d* in the extension section 17 in an axial direction.

Further, the auxiliary seal lip 27 is provided on an inner periphery of the intermediate tube section 20*d* in the dust cover 20, extends so as to have a conical tubular shape in which the end directed to an outer side is smaller in diameter, and is slidably brought into close contact with the outer peripheral surface of the intermediate tube section 17*b* in the extension section 17 of the reinforcing ring 11 of the oil seal 10.

Further, the labyrinth seal 30 is constructed by an inside disc-shaped gap 31 corresponding to a section in which the intermediate flange 17*c* of the extension section 17 and the intermediate flange 20*e* of the dust cover 20 (or the elastic layer 28 attached to the inner side surface thereof) are opposed to each other in the axial direction, a tubular gap 32 corresponding to a section in which the outer tube section 17*d* of the extension section 17 and the outer tube section 20*f* of the dust cover 20 (or the elastic layer 28 attached to an outer peripheral surface thereof) are opposed to each other in a radial direction at an outer side thereof, and an outer diameter gap 33 corresponding to a section in which the outer tube section 17*d* of the extension section 17 and the collar section 20*g* of the dust cover 20 are opposed to each other in the axial direction at a further outer side thereof.

The other sections are constructed in the same manner as those of FIGS. 9 and 10.

Accordingly, in the eighth embodiment shown in FIG. 11, the oil seal 10, the labyrinth seal 30, the non-contact lips 25 and 16 and the like achieve the same actions as those of the previously described first embodiment.

In this case, since the auxiliary seal lip 27 is brought into close contact with the outer peripheral surface of the intermediate tube section 17*b* in the extension section 17 of the reinforcing ring 11, the centrifugal force acts in such a manner as to reduce the fastening margin with respect to the intermediate tube section 17*b*, by being rotated together with the dust cover 20. Therefore, an increase of the sliding resistance by the auxiliary seal lip 27 is prevented. Further, the fastening margin of the auxiliary seal lip 27 is reduced in accordance with the higher speed rotation, however, since rejecting force caused by the centrifugal force in the labyrinth seal 30 rises, the reduction of the muddy water sealing performance is not caused.

Figure 12:
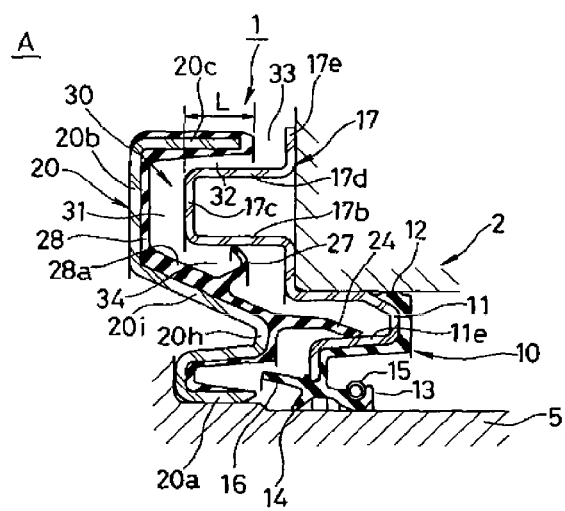
FIG. 12 is a half sectional view of an installed state and shows a preferable ninth embodiment of the sealing device in accordance with the present invention by cutting along a plane passing through an axis O.
Figure 13:
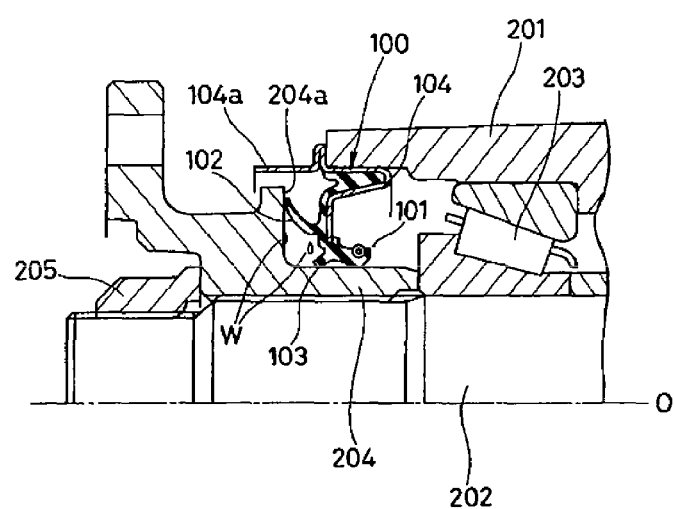
FIG. 13 is a half sectional view of an installed state and shows an example of a sealing device in accordance with a conventional art by cutting along a plane passing through an axis.

Next, FIG. 12 is a half sectional view of an installed state and shows a preferable ninth embodiment of the sealing device in accordance with the present invention by cutting along a plane passing through an axis O.

In this embodiment, describing a different point from the previously described seventh or eighth embodiment, a cylinder section 11*e* is formed in the vicinity of the inner diameter section of the reinforcing ring 11 in the oil seal 10, and an intermediate tube section 17*b* and an outer tube section 17*d* of an extension section 17 extending from an outer diameter section of the reinforcing ring 11 are formed longer in the axial direction than those of the seventh embodiment (FIGS. 9 and 10).

On the other hand, in the dust cover 20, a bent section 20*h* protruding largely to an inner diameter side of the intermediate tube section 17*b* in the extension section 17 of the reinforcing ring 11 of the oil seal 10 is formed between the inner diameter fitted section 20*a* and the flange section 20*b*, and an outer peripheral side thereof continues to a conical tube section 20*i* which becomes larger in diameter little by little toward an opposite side to the oil seal 10 (the flange section 20*b* side). Further, an outer tube section 20*c* of the dust cover 20 is formed longer in an axial direction than the structure in accordance with the seventh embodiment (FIGS. 9 and 10) in correspondence to the outer tube section 17*d* of the extension section 17 of the reinforcing ring 11 in the oil seal 10.

The external seal lip 24 which is formed integrally on the dust cover 20 by the rubber-like elastic material (the rubber material or the synthetic resin material having the rubber-like elasticity) extends in a conical tubular shape, the diameter of which becomes smaller little by little toward the oil seal 10 side from the vicinity of the bent section 20*h* in the dust cover 20, and an inner diameter of its end is slidably brought into close contact with an outer peripheral surface of the cylinder section 11*e* in the reinforcing ring 11 of the oil seal 10.

Further, at an outer peripheral side of the external seal lip 24, the auxiliary seal lip 27 extending to an outer diameter side in a convexly curved shape toward the external seal lip 24 side is provided on a conical surface section 28*a* of an elastic layer 28 which is attached to an outer peripheral surface of the conical tube section 20*i* in the dust cover 20 and has a conical surface corresponding to the conical tube section 20*i*, and an outer diameter end section thereof is slidably brought into close contact with the inner peripheral surface of the intermediate tube section 17*b* in the extension section 17 of the reinforcing ring 11 of the oil seal 10.

In this case, a basic structure of the oil seal 10 is the same as that of FIGS. 9 and 10.

In accordance with this ninth embodiment, even if any play exists in the axial direction between the oil seal 10 and the dust cover 20 on the basis of a play in the axial direction between the housing 2 and the rotating body (the sleeve 5 and the rotating shaft and the like), the fastening margin of the external seal lip 24 is not changed. Accordingly, it is possible to achieve a stable muddy water resisting sealing function.

Further, an axial length L of the tubular gap 32 in the labyrinth seal 30 becomes longer by forming the outer tube section 17*d* of the extension section 17 of the reinforcing ring 11 in the oil seal 10 and the outer tube section 20*c* of the dust cover 20 longer in the axial direction. Further, since the auxiliary seal lip 27 is formed on the conical surface section 28*a* of the elastic layer 28 having the conical surface corresponding to the conical tube section 20*i* in the dust cover 20, the muddy water is easily removed along the conical surface section 28*a* on the basis of the centrifugal force, even if the muddy water reaches the inner tubular gap 34 in the labyrinth seal 30 (a front space of the auxiliary seal lip 27). Accordingly, a labyrinth seal effect by the labyrinth seal 30 is improved.

In this case, in the structure in which the external seal lip 24 is slidably brought into close contact with the surface which is orthogonal to the axis such as the inner diameter flange 17*a* or the like, for example, in the seventh embodiment, if any play exists in the axial direction between the oil seal 10 and the dust cover 20, the fastening margin of the external seal lip 24 is changed. Accordingly, there is a risk of causing an early abrasion or damage due to a solid contact of the external seal lip 24, or causing the reduction of the muddy water sealing performance due to lack of the fastening margin instead. Further, since the tubular gap 32 in the labyrinth seal 30 is comparatively short, it is unsuitable for muddy water seal means at a differential gear side having a great play in the axial direction. On the contrary, in accordance with the ninth embodiment, since the fastening margin of the external seal lip 24 with respect to the cylinder section 11*e* of the reinforcing ring 11 is not changed even at the position in which the play in the axial direction is great, and the long tubular gap 32 in the labyrinth seal 30 is secured even if any play in the axial direction exists, as mentioned above, an excellent muddy water sealing function is secured.

What is claimed is:

1. A sealing device comprising:
    an oil seal attached to a non-rotating housing, and having an oil resisting seal lip slidably brought into close contact with a rotating body inserted transversally to an inner periphery of the housing, the oil seal including:
        a reinforcing ring; and
        an extension section extending from the reinforcing ring, the extension section including:
            an inner diameter flange extending in an approximately disc shape from an outer diameter section of the reinforcing ring so as to contact an end surface of an opening end section of the housing;
            an intermediate tube section extending in a cylindrical shape from an outer diameter end of the inner diameter flange away from the housing;
            an intermediate flange extending in an approximately disc shape towards an outer diameter side of the oil seal from an end of the intermediate tube section;
            an outer tube section extending cylindrically back towards the housing from an outer diameter end of the intermediate flange; and
            a collar section extending in an approximately disc shape from an end of the outer tube section towards the outer diameter side; and
    a dust cover attached to the rotating body and axially opposing the oil seal, the dust cover including:
        an inner diameter fitted section attached to an outer peripheral surface of the rotating body;
        a flange section extending in an outer diameter direction from the inner diameter fitted section and opposing the inner diameter flange and the intermediate flange of the extension section of the oil seal; and
        an outer tube section extending from an outer diameter end of the flange section and surrounding an outer peripheral side of the outer tube section of the extension section and having an end axially opposing the collar section of the extension section,
    wherein the dust cover is provided with an external seal lip which is positioned at an outer side of a slide section between the oil resisting seal lip and rotating body and is slidably brought into close contact with the oil seal,
    a labyrinth seal is provided at an outer diameter side of the external seal lip, and the labyrinth seal is constructed by:
        a gap between the intermediate flange of the extension section and the flange section of the dust cover which are opposed in an axial direction to each other;
        a tubular gap between the outer tube section of the extension section and the outer tube section of the dust cover which are opposed in a radial direction to each other; and
        an outer diameter gap between the collar section of the extension section and the end of the outer tube section of the dust cover, which are opposed in the axial direction to each other;
    the dust cover is provided with an auxiliary seal lip positioned between the external seal lip and the labyrinth seal, the auxiliary seal lip has a folded shape pressing against the intermediate tube section of the extension section, and is thinner than the external seal; and
    an elastic layer covers an entire inner surface of the dust cover facing the extension section of the oil seal.

2. The sealing device as claimed in claim 1, wherein the external seal lip is slidably brought into close contact with an outer peripheral surface of a cylinder section which is formed in the oil seal.

* * * * *